United States Patent [19]

Komoda et al.

[11] Patent Number: 5,701,354
[45] Date of Patent: Dec. 23, 1997

[54] TELEPHONE MOUTHPIECE FOR PREVENTING WIND NOISES AND METHOD FOR REDUCING WIND NOISES INPUT THERETO

[75] Inventors: Motoyoshi Komoda, Tokyo; Yukio Murata, Saitama, both of Japan

[73] Assignee: NEC Corporation, Tokyo, Japan

[21] Appl. No.: 541,411

[22] Filed: Oct. 10, 1995

[30] Foreign Application Priority Data

Oct. 12, 1994 [JP] Japan ................ 6-246109

[51] Int. Cl.$^6$ ................ H04R 25/00
[52] U.S. Cl. ............ 381/157; 381/168; 381/169; 181/242; 379/433
[58] Field of Search ............ 381/153, 154, 381/155, 157, 159, 168, 169; 379/428, 433; 181/242, 158, 171

[56] References Cited

U.S. PATENT DOCUMENTS

| | | | |
|---|---|---|---|
| 3,553,374 | 1/1971 | Wolf | 179/1 C |
| 3,796,842 | 3/1974 | Guille | 181/34 |
| 4,817,168 | 3/1989 | Fidi | 381/155 |
| 5,144,656 | 9/1992 | Oku | 379/428 |
| 5,239,578 | 8/1993 | Regen et al. | 379/428 |
| 5,282,245 | 1/1994 | Anderson | 381/169 |
| 5,288,955 | 2/1994 | Staple et al. | |
| 5,343,523 | 8/1994 | Bartlett | 379/430 |
| 5,491,747 | 2/1996 | Barltett et al. | 379/433 |
| 5,606,607 | 2/1997 | Yamaguchi et al. | 379/430 |

FOREIGN PATENT DOCUMENTS

| 1139649 | 9/1989 | Japan . |
|---|---|---|
| 2214400 | 8/1990 | Japan . |

*Primary Examiner*—Curtis Kuntz
*Assistant Examiner*—Rexford N. Barnie
*Attorney, Agent, or Firm*—Whitham, Curtis, Whitham & McGinn

[57] ABSTRACT

The telephone mouthpiece of the present invention comprises a microphone unit 3, a unit housing section 1 and an acoustic duct section 2 tightly fitted to the unit housing section 1. The unit housing section 1 comprises a flat plate 11 and a cylindrical housing 12 housing the microphone unit 3 provided on the flat plate 11. The acoustic duct section 2 comprises: an acoustic duct box 21 in the form of a box in close contact with the corresponding flat plate 11; and a cylindrical box 22 in close contact with the cylindrical box 12 at an end of the acoustic duct box 21; partitions 23 and 24 for partitioning inside of the acoustic duct box 21 into a plurality of air chambers; and slits 29 and 30 provided on the partitions 23 and 24.

20 Claims, 9 Drawing Sheets

---------- WIND NOISE IN CASE OF NO ACOUSTIC DUCT

———— WIND NOISE IN CASE OF THE PRESENT INVENTION

TELEPHONE MOUTHPIECE FOR PREVENTING WIND NOISES AND METHOD FOR REDUCING WIND NOISES INPUT THERETO

BACKGROUND OF THE INVENTION

This invention relates to a telephone mouthpiece and, more particularly, to an art for a telephone mouthpiece for preventing wind noises used for a hand-held-portable phone or the like.

A conventional telephone mouthpiece is described by referring to the attached prior art drawings.

A first prior art has been disclosed in Japanese Patent Laid-Open No. 214400 (1990), and will be described referring to the attached FIG. 11 block diagram.

A microphone 51 converts a vocal sound to an electric signal and outputs a voice signal. This voice signal is supplied to a high-pass filter 58 and a low-pass filter 59 via a pre-amplifier circuit 52, respectively.

The high-pass filter 58 is designed so as to pass signals at frequencies of 150 Hz or higher. On the other hand the low-pass filter 59 is designed so as to pass low frequency signals containing a main factor of wind noises at frequencies of 150 Hz or lower.

An output signal of the high-pass filter 58 is supplied to an input terminal of an adder circuit 61.

An output signal of the low-pass filter 59 is supplied to another input terminal of the adder circuit 61 via an automatic level control circuit 60. At this time, the automatic level control circuit 60 supplies the output signal of the low-pass filter 59 to an input side of a variable gain amplifier circuit 60a, while the variable gain amplifier circuit 60a supply its output signal to another input terminal of the adder circuit 61. Simultaneously the automatic level control circuit 60 supplies the output signal of the variable gain amplifier circuit 60a to a level detection circuit 60b, and reduces a gain of the variable gain amplifier circuit 60a in accordance with a detection level determined by the level detection circuit 60b. Namely, the automatic level control circuit 60 is designed to have no level attenuation at absence of wind noises and to increase the level attenuation as the wind noises level grows.

However, the first prior art has some problems such as a complex electric circuit construction and an unnatural feeling while speaking caused by alteration of the talker's voice quality, which is due to alteration of frequency response when the wind noise prevention function is ON.

Next, a second prior art is explained. The second prior art has been disclosed in Japanese Utility Model Application Laid-Open No. 139649 (1989).

FIG. 12 shows a hand set constructed as a second prior art. FIG. 13 represents a fragmentary view taken in the direction of an arrow in FIG. 12.

Referring to FIG. 12 and FIG. 13, a protuberant telephone mouthpiece surface 76 is dome-like shaped with its top positioned at a center of a telephone mouthpiece unit 73 connected to a base 72. An acoustic perforation 721 is formed slightly apart from the top of the dome-like shaped telephone mouthpiece surface 76 in the direction opposite to a receiver unit 74. The acoustic perforation 721 is formed to be apart from the receiver unit 74 as it goes from a front air chamber 78 toward the telephone mouthpiece surface 76.

When speaking with the above-constructed hand set 71, the talker is usually supposed to have his/her ear tightly pressed to the receiver unit 74 for catching the other party's voice through an electrodynamic receiver 75. The talker's cheek is then in close contact with the surface of the base 72. The talker's lips also locate too close to the side of the protuberant domed-shaped telephone mouthpiece surface 76 of the telephone mouthpiece unit 73 in the direction of the receiver unit 74.

When the talker speaks in this situation, his/her breathing is directed to the telephone mouthpiece unit 73. The talker's breathing, which acts as a wind, is caused to flow directly to the section of the telephone mouthpiece surface 76 in the direction of the receiver unit 74 as an arrow A shows.

The opening section of the acoustic perforation 721 locates apart from the top of the telephone mouthpiece surface 76 in the direction toward the receiver unit 74. The acoustic perforation 721 is so formed to be a part of the receiver unit 74 as it goes from the front air chamber 78 to the telephone mouthpiece surface 76.

This construction serves to prevent the wind from entering into the acoustic perforation 721 directly, thus suppressing turbulence occurred therein and eliminating noises. Since the space between the talker's lips and the acoustic perforation 721 is remarkably small, the vocal sound itself becomes almost non-directional, resulting in no degradation in the voice signal. The prior art requires no additional parts or major design modification, reducing the wind noise at a minimum cost.

This second prior art reduces breathing noises of the talker. When using it outdoors, however, its noise suppression effects outdoors turbulence is hardly expected because it is constructed to cope with the air flow in a certain direction only.

SUMMARY OF THE INVENTION

It is an object of the present invention to solve the above-mentioned problems.

It is another object of the present invention to provide reduction of wind noises even out of doors.

It is still another object of the present invention to prevent resonance due to wind noises at the acoustic duct section of a telephone mouthpiece.

The object of the present invention is achieved by a telephone mouthpiece for preventing wind noises comprising: an acoustic duct box provided with an acoustic perforation; a microphone unit provided on a surface of the acoustic duct box facing to another surface of the acoustic duct box having the acoustic perforation; a plurality of partitions provided within the acoustic duct box; and a plurality of slits respectively provided on the partitions.

The principle of the present invention will be explained below. In FIG. 1 and FIG. 2, $P_A$ is an acoustic pressure caused by a talker, $P_B$ is an acoustic pressure caused by wind noises at an acoustic perforation 1. L is a distance which a voice of the talker passes until reaching the acoustic perforation 1, and R is an acoustic resistance. l and l' are acoustic duct distances between the acoustic perforation 1 and a microphone unit 2, respectively, and r and r' are resistances of distance l and distance l', respectively. In a general hand-held-portable phone, L is in cm magnitude and l is in mm magnitude, so the relation between R and r is R>r. Here, supposing that the length of the acoustic duct is l' that is longer than l as shown in the figures, the relation between them is r'>r. As a result, the relation among acoustic resistances is R>r'>r. In general, generally L>l' due to limitations when mounting the microphone in a hand-held-portable phone.

Next, the attenuation ratios of the generated acoustic pressure $P_A$ and the wind noise pressure $P_B$ will be compared for the case where the acoustic duct distance is l with the acoustic duct distance being l'. To simplify the explanation, we will assume that r=1, r'=2, R=3 and that each acoustic resistance represents its sound source.

In this case, the attenuation ratio A of the generated acoustic pressure $P_A$ is:

$$A=(r+R)/(r'+R)=(1+3)/(2+3)=4/5.$$

As shown, if the acoustic duct distance is l', the generated acoustic pressure $P_A$ is reduced 20% as against the case that the acoustic duct distance is l.

On the other hand, the attenuation ratio B of the wind noise acoustic pressure $P_B$ is:

$$B=r/r'=1/2.$$

Therefore, when the acoustic duct distance is l', the wind noise acoustic pressure $P_B$ is reduced 50% as against the case that the acoustic duct distance is l.

This means that the longer the acoustic duct distance is set, the more the wind noise acoustic pressure $P_B$ is reduced than the generated acoustic pressure $P_A$. Accordingly, setting the acoustic duct distance longer prevents wind noises more effectively.

However, setting the acoustic duct distance long causes a resonance phenomenon due to a frequency response of wind noises.

To prevent this resonance phenomenon of wind noises, the acoustic duct is partitioned with slits.

In addition, air chambers formed by the partitions serve to attenuate the wind noises acoustic pressure to the microphone more than that of the generated acoustic pressure of a talker.

As a result, the present invention enables reduction of wind noises without diminishing the sound quality of a talker.

BRIEF DESCRIPTION OF THE DRAWINGS

This and other objects, features and advantages of the present invention will become more apparent upon a reading of the following detailed description and drawings, in which.

DESCRIPTION OF THE PREFERRED EMBODIMENTS

The present invention is now explained in greater detail.

Figure 1:
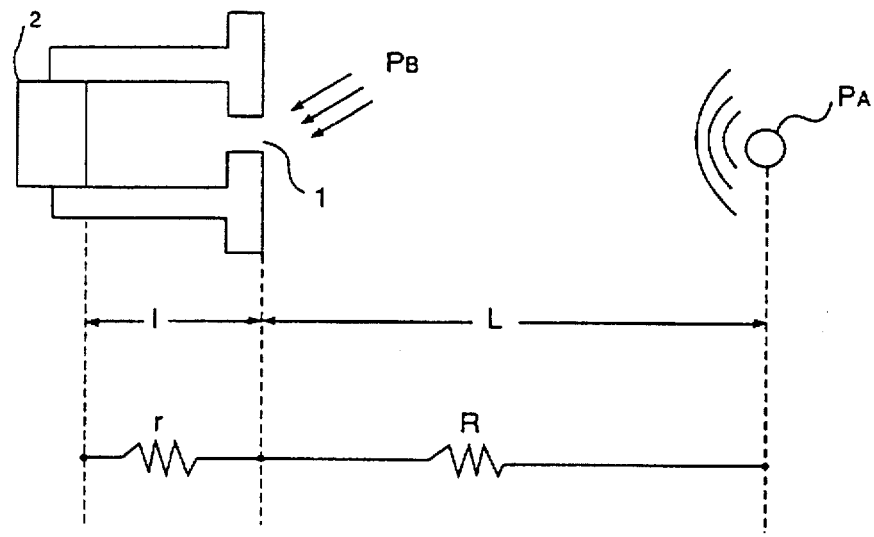
FIG. 1 is a figure for explaining a principle of the present invention.
Figure 2:
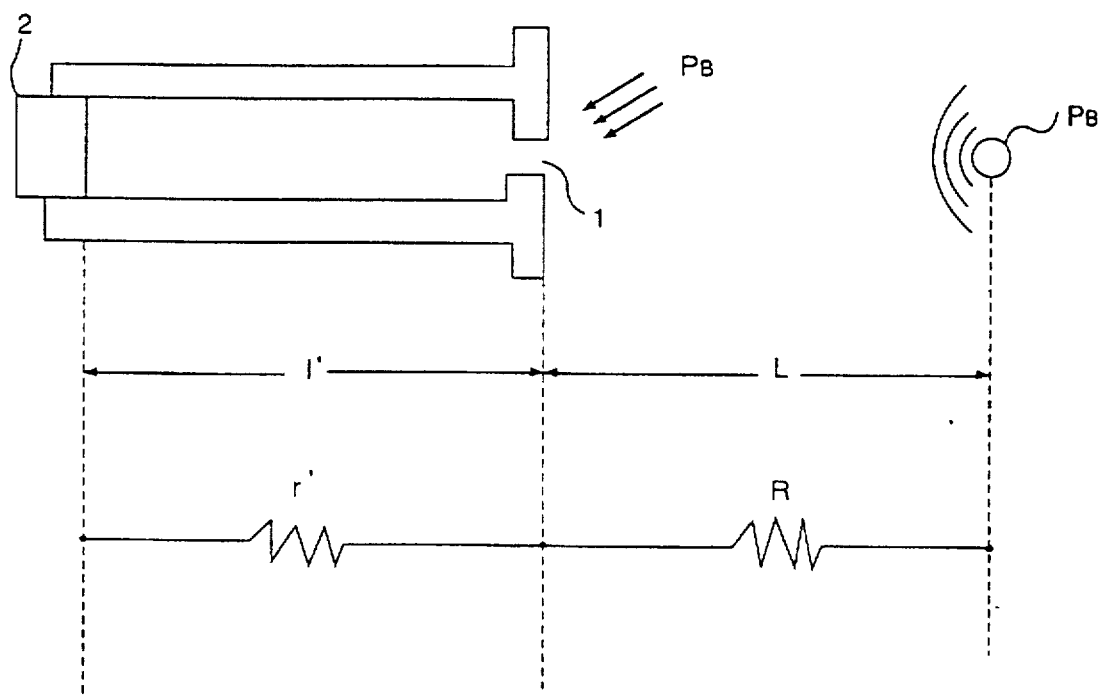
FIG. 2 is a drawing for explaining a principle of the present invention.
Figure 3:
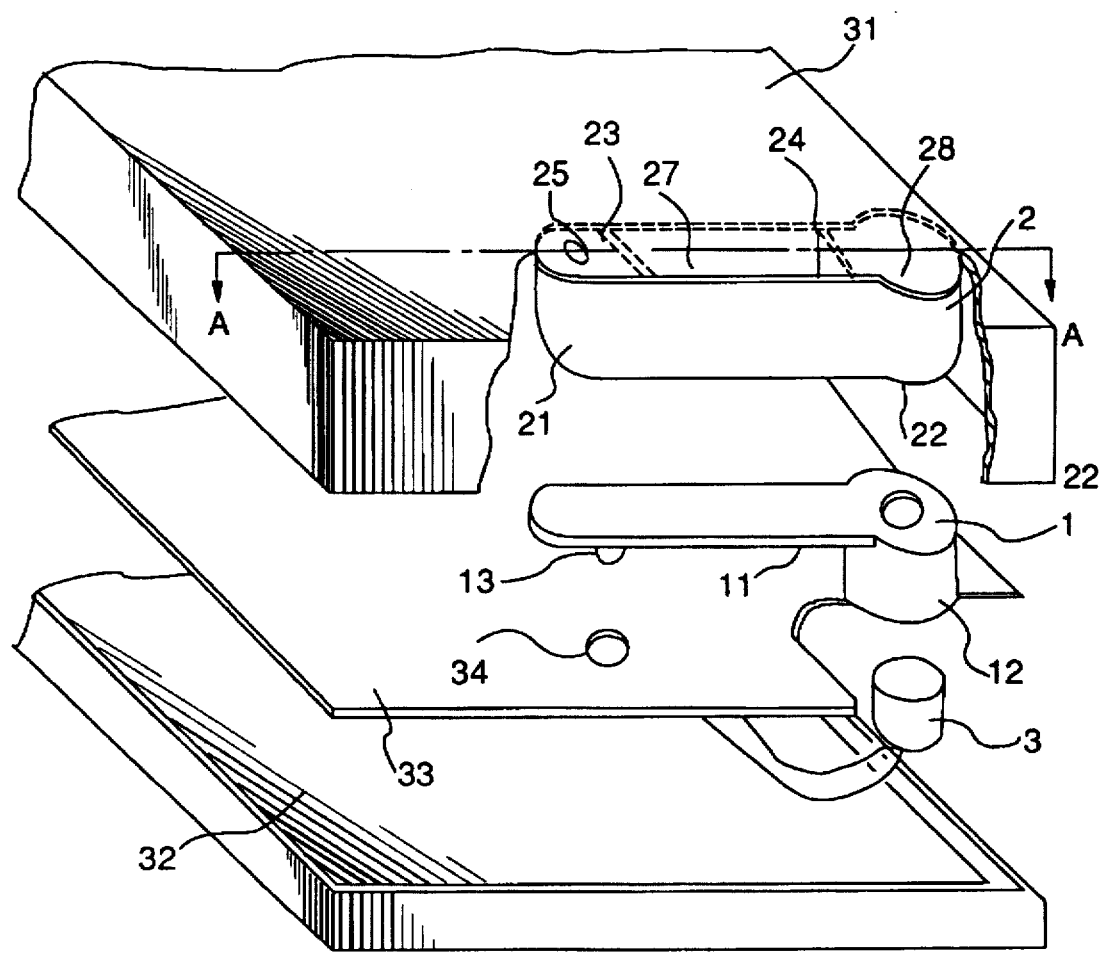
FIG. 3 is an exploded view showing a part of a hand-held-portable phone mounted with an embodiment of the present invention.
Figure 4A:
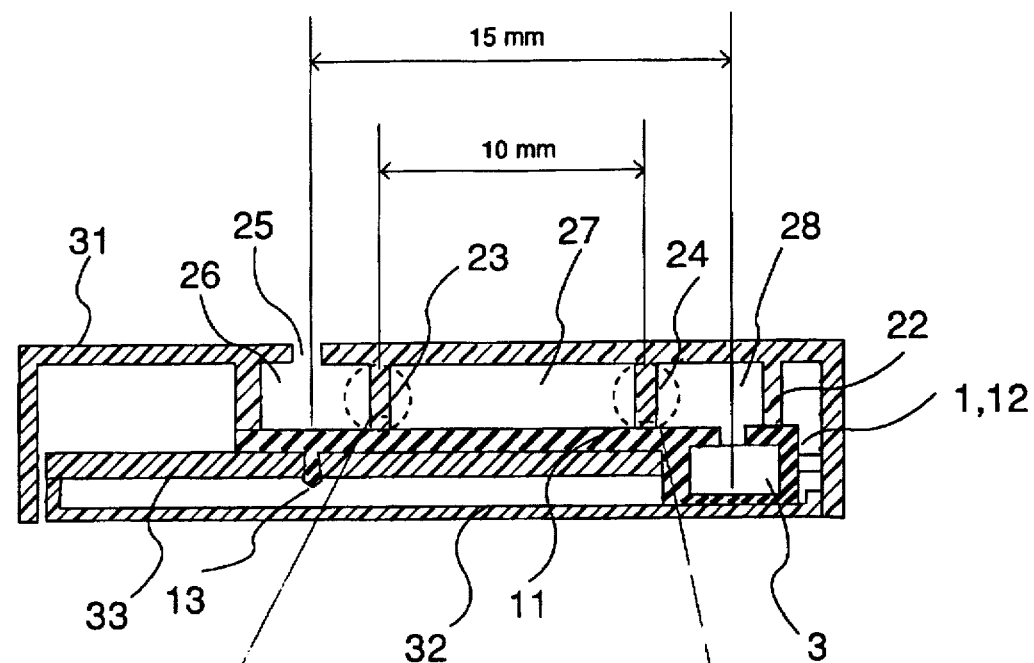
FIG. 4A is a cross section view of A—A in FIG. 3 and FIGS. 4B and 4C are enlarged views of partitions shown in FIG. 4A.
Figure 4B:
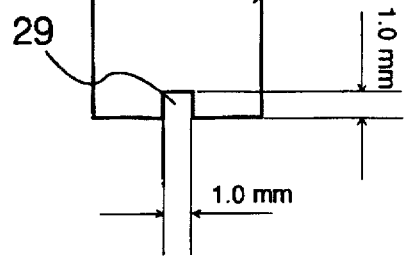
Figure 4C:
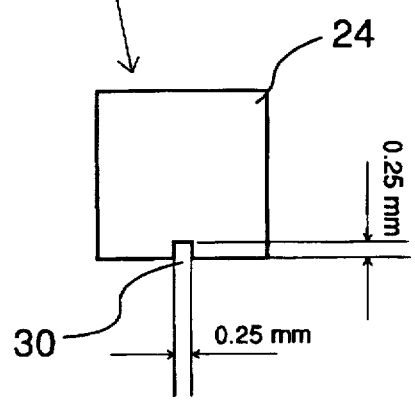
Figure 5:
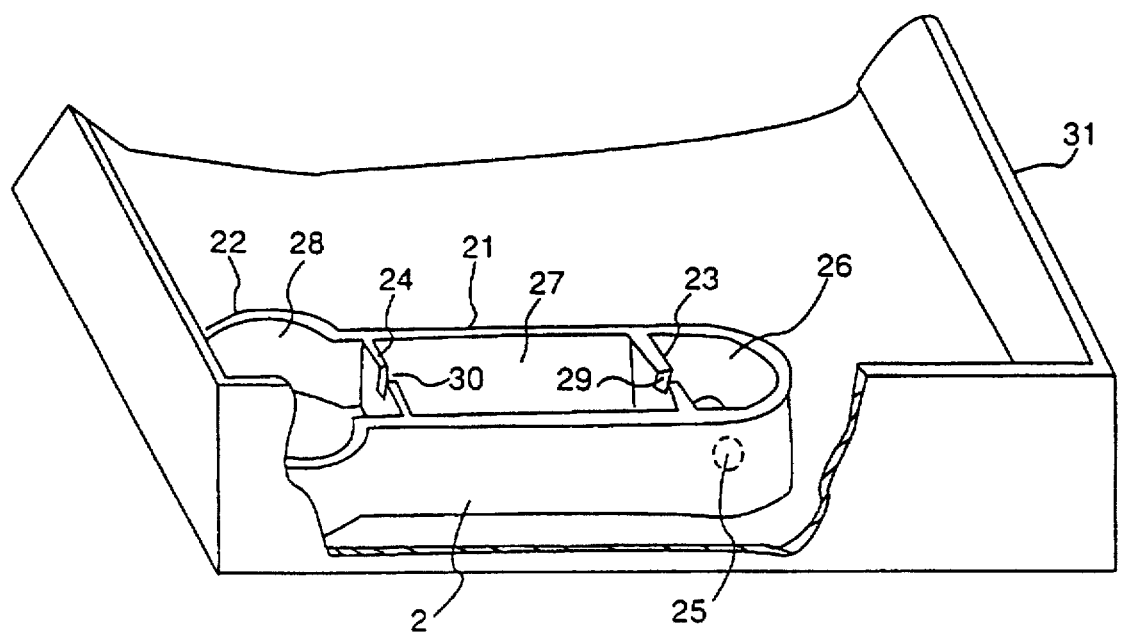
FIG. 5 is a view showing a reversed upper enclosure of the hand-held-portable phone of FIG. 3.

FIG. 3 is a exploded view showing a part of a hand-held-portable phone mounted with an embodiment of the present invention, FIG. 4 is a cross section view of A—A in FIG. 3 and FIG. 5 is a view showing a reversed upper enclosure of the hand-held-portable phone of FIG. 3.

Referring to FIGS. 3, 4 and 5, the telephone mouthpiece of this embodiment comprises a unit housing section 1, an acoustic duct section 2 tightly fitted thereto which has been integrally formed with an upper enclosure 31 of the hand-held-portable phone and a microphone unit 3 connected to an electronic circuit base 33 within the hand-held-portable phone.

The unit housing section 1 is formed of a rubber member and has a cylindrical housing 12 for housing the microphone unit 3 at an end of a flat plate 11. A protrusion 13 is provided at the other end of the flat plate 11 to be positioned and fixed into a hole 34 formed in the electronic circuit base 33. The reason for forming the unit housing section 1 of a rubber member is to increase air tightness with the acoustic duct section 2 and to prevent leakage of sound.

The acoustic duct section 2 comprises an acoustic duct box 21 in the form of a box in close contact with the corresponding flat plate 11, and a cylindrical box 22 in close contact with the cylindrical housing 12 at an end of the acoustic duct box 21. The acoustic duct box 21 comprises an acoustic perforation 25 at the other end of the acoustic duct box 21 and on a surface opposite to the surface facing the flat plate 11, and partitions 23 and 24 for partitioning the inside of the acoustic duct box 21 into two air chambers 26 and 27. The partitions 23 and 24 are provided with slits 29 and 30, respectively.

The unit housing section 1 and the acoustic duct section 2 forming the telephone mouthpiece of the present embodiment are disposed between the upper enclosure 31 and a lower enclosure 32.

In the present invention, as shown in FIGS. 4A, 4B, and 4C, it is supposed that a length of the acoustic duct is 15 mm, a distance between partitions 23 and 24 is 10 mm, a length of a side of the slit 29 is 1.0 mm, and a length of a side of the slit 30 is 0.25 mm.

Figure 6:
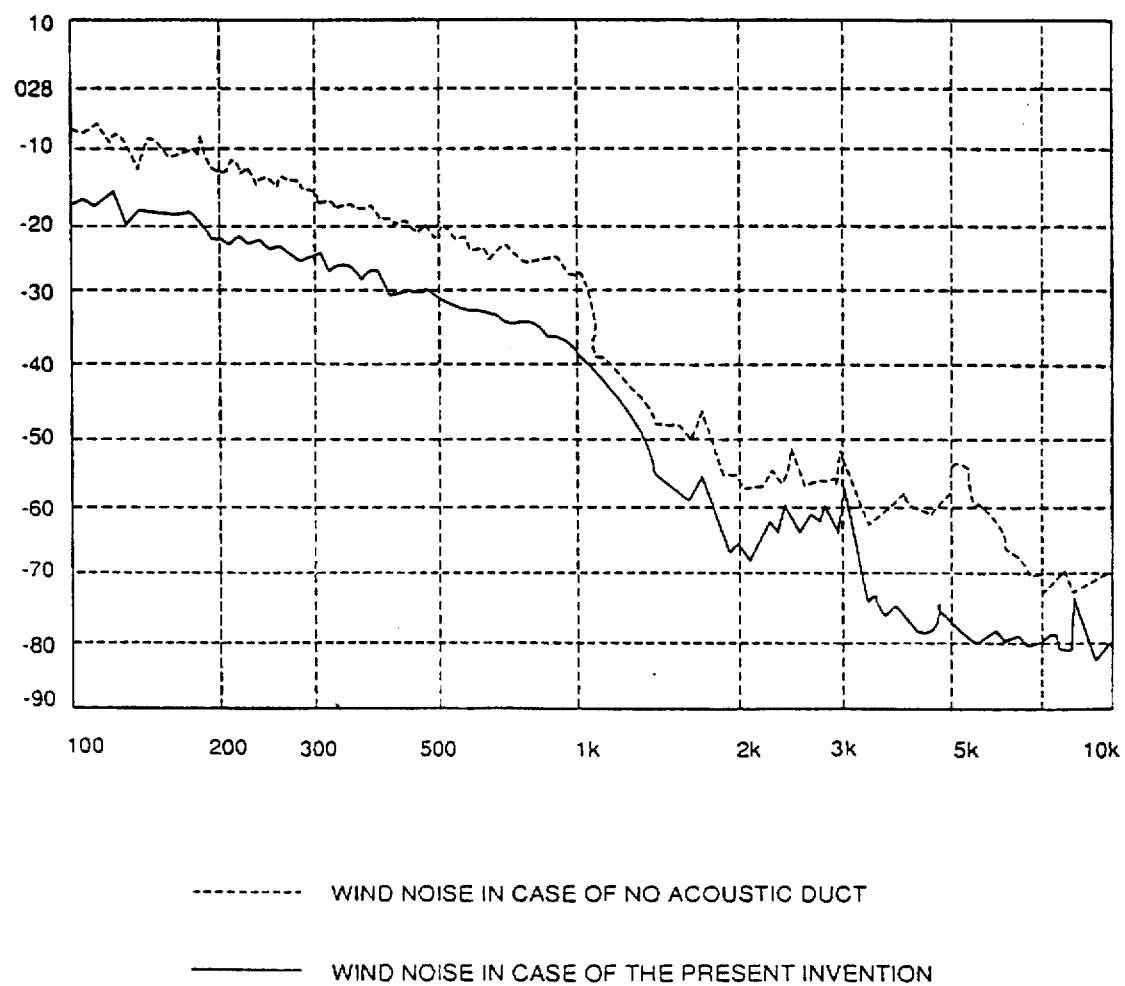
FIG. 6 is a comparison data of the present embodiment and a prior art.

FIG. 6 shows a comparison data on wind noises of the embodiment constructed as above of the present invention and a conventional telephone mouthpiece that does not have a substantial acoustic duct and has a microphone closely located to an acoustic perforation.

As FIG. 6 shows, the telephone mouthpiece of the present embodiment reduces wind noises more than the conventional telephone mouthpiece.

Next, substitution of the present embodiment by an equivalent circuit is explained.

For simplicity of explanation, an experimental result of a primary resonance circuit is explained first.

Figure 7:
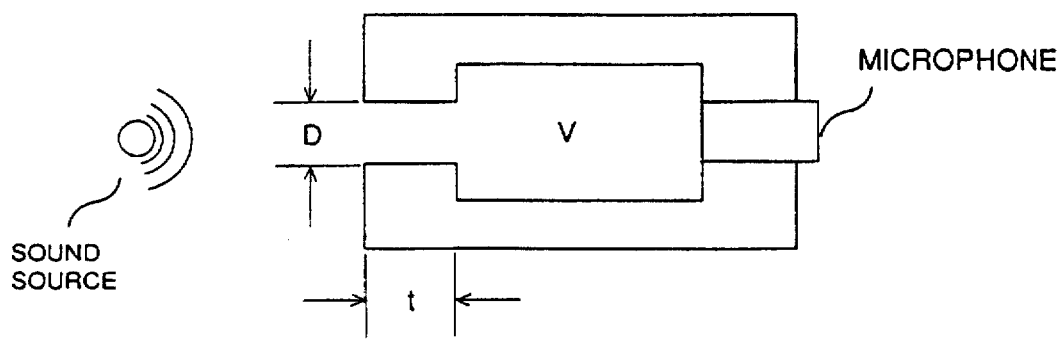
FIG. 7 shows an acoustic duct model in case of primary resonance.
Figure 8:
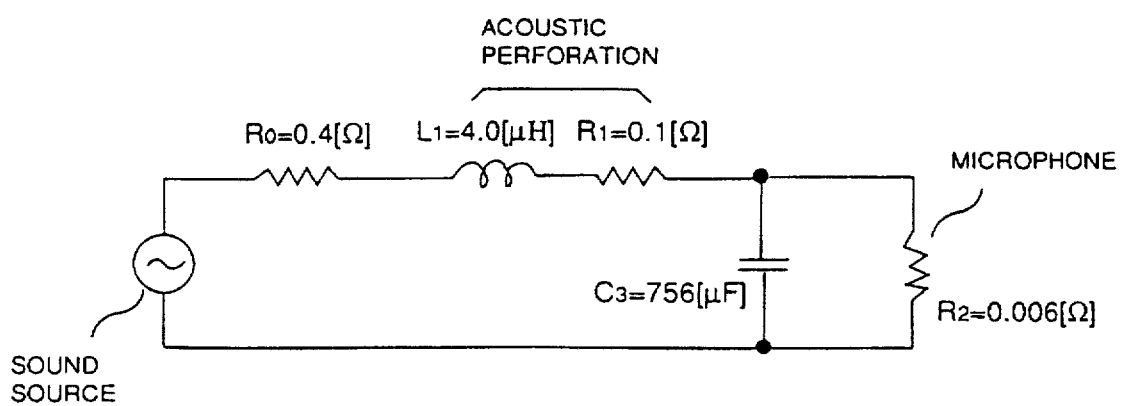
FIG. 8 shows an equivalent circuit of the acoustic duct model of FIG. 7.

FIG. 7 shows an acoustic duct model in the case of primary resonance, and FIG. 8 shows an equivalent circuit of the acoustic duct model of FIG. 7.

In FIG. 7, D is a diameter of an acoustic perforation, t is a wall of an acoustic perforation section and V is a volume of an acoustic duct. Here, D=0.8 mm, t=0.8 mm and V=130 mm$^3$ are assumed.

When substituting an acoustic model by an equivalent circuit, an acoustic perforation (slit) can be substituted by a coil L and a resistor $R_1$. Also, a volume, a length of an acoustic duct and a microphone can be substituted by a capacitor C, a resistor $R_0$ and a resistor $R_2$, respectively.

It is known that each value of a circular acoustic perforation is given by the following equation:

$$L=2(t+0.75\times D)/344000\times D^2\times\pi [H]$$

$$C=2V/344000 [F]$$

$$R=1/\omega_0 \times Q \times C [\Omega]$$

where, unit is mm, 34400 is the speed of sound, $\omega_0$ is an angle speed at resonance point and Q represents sharpness of resonance.

Figure 9:
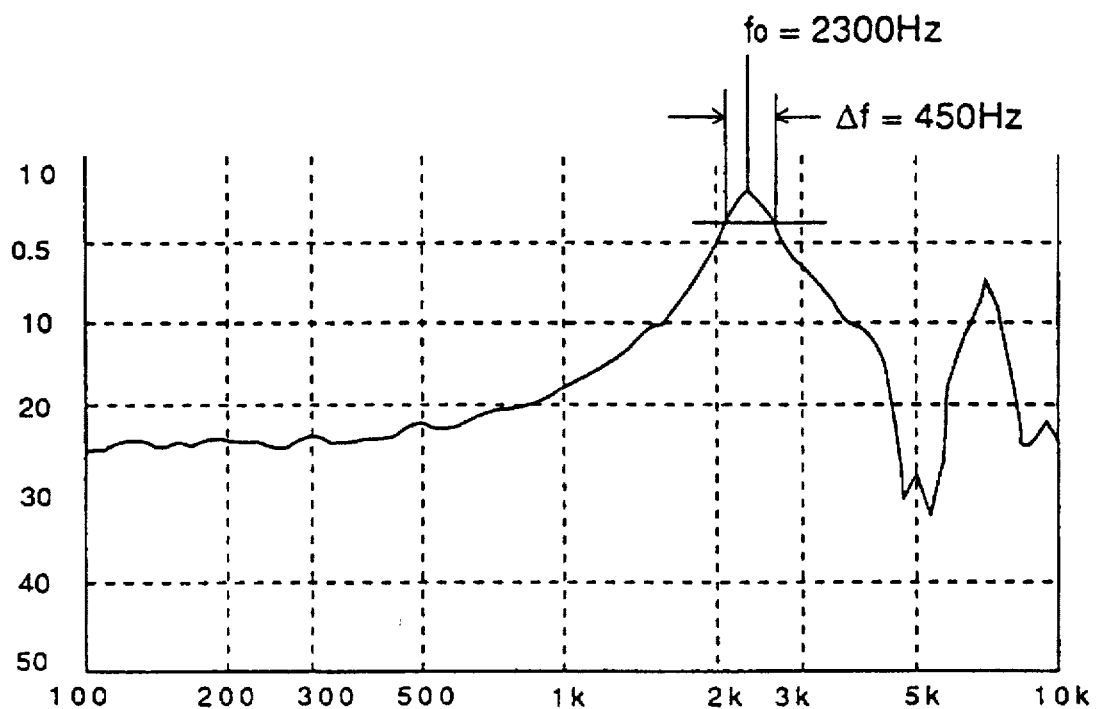
FIG. 9 shows a frequency response of the acoustic duct model.

Here, a frequency response of the acoustic duct model is shown by FIG. 9.

From the frequency response of FIG. 9, the following relations are derived:

$$Q=f_0/\text{if}=2300/450=5.1$$

$$C=2V/344000=(2\times 130)/344000 \fallingdotseq 756 \; \mu F$$

$$R_1+R_0=1/(\omega_0\times Q\times C) =1/(2300\times 2\pi\times 5.1\times 756\times 10^8)\fallingdotseq 0.018 [\Omega]$$

From real measurement, $R_0=0.4\Omega$ and $R_2=0.006\Omega$. Therefore, $$R_1=0.1\Omega,$$

$$L=2(0.8+0.15\times 0.8)/344000\times 0.8^2\times 3.14 \fallingdotseq 4.0[H].$$

Next, each value of the equivalent circuit of the present invention is calculated.

When the slit is a square like in the present invention, D is calculated by substituting an area of a circular slit by an equivalent area. As a result, D of the slit 29 of the present invention is 1.1 mm approximately and D of the slit 30 is 0.28 mm approximately.

In addition, R∝t/s is known, where, s is an area of a cross section of the acoustic perforation (slit).

Figure 10:
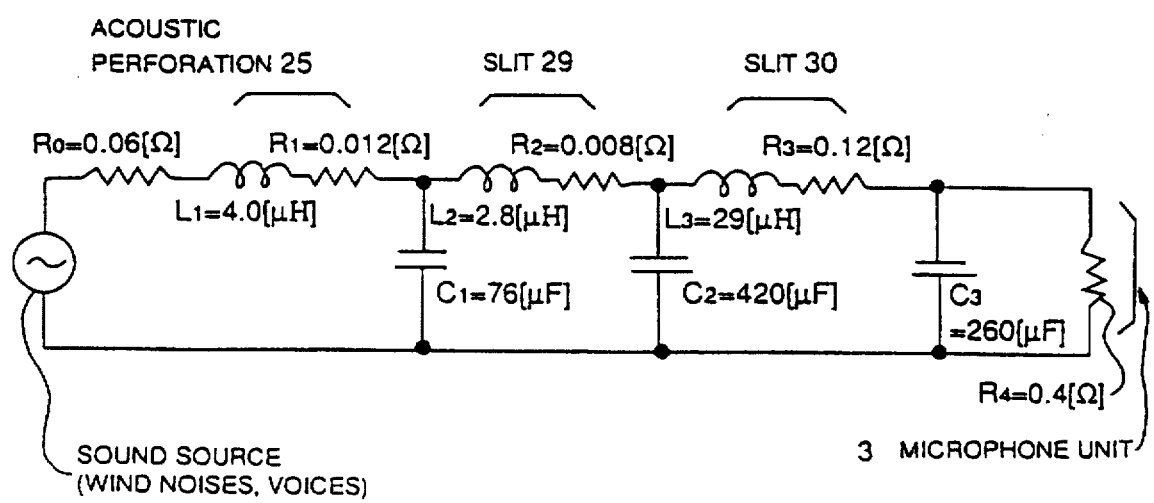
FIG. 10 is a diagram showing an equivalent circuit of the present embodiment.
Figure 11:
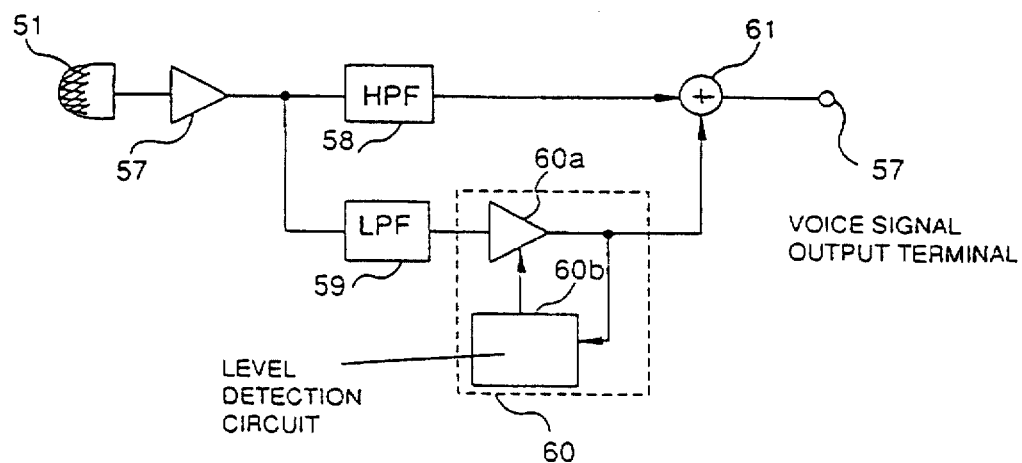
FIG. 11 is a block diagram showing a first prior art.
Figure 12:
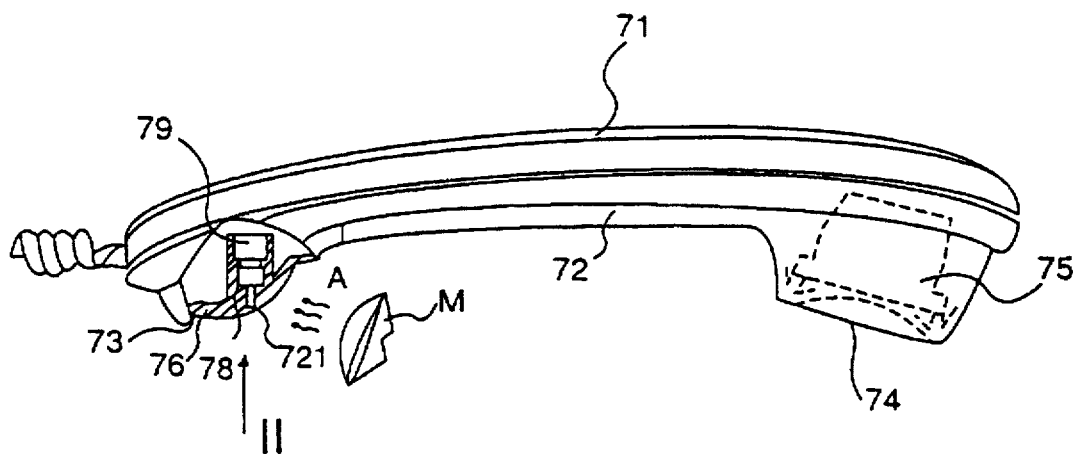
FIG. 12 is a view showing a layout of a hand set of a second prior art.
Figure 13:
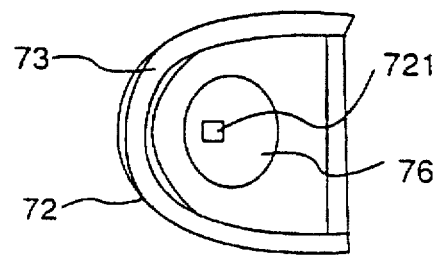
FIG. 13 is a fragmentary view taken in the direction of an arrow in FIG. 12.

Similar to the above, an equivalent circuit of the present invention is calculated, resulting FIG. 10. In FIG. 10, the acoustic perforation 25 is replaced by a series circuit of a coil $L_1$ and a resistor $R_1$. A slit 29 is replaced by a series circuit of a coil $L_2$ and a resistor $R_2$. A slit 30 is replaced by a series circuit of a coil $L_3$ and a resistor $R_3$. Air chambers 26, 27 and 28 are replaced by capacitors $C_1$, $C_2$ and $C_3$, respectively. The microphone unit 3 is replaced by a resistor $R_4$. The length of the acoustic duct is substituted by $R_0$. The acoustic duct section 2 as a whole is equivalent to a multi-staged low pass filter.

Simulation based on the equivalent circuit shown in FIG. 7 allows varying the values of the distance between the partition 23 and the partition 24 (the positions of air chambers 26, 27 and 28) and the sizes of slits 29 and 30 to values other than those of the present invention.

What is claimed is:

1. A telephone mouthpiece for preventing wind noise, comprising:

a telephone mouthpiece enclosure;

an acoustic duct box arranged within said telephone mouthpiece enclosure and having a first surface and a second surface facing said first surface, said first surface having an acoustic perforation formed therein;

a microphone arranged on said second surface of said acoustic duct box, said microphone having a receiving surface facing said first surface; and a plurality of partitions arranged within said acoustic duct box between said acoustic perforation and said microphone receiving surface, each of said plurality of partitions having a slit formed therein.

2. A telephone mouthpiece according to claim 1, wherein said plurality of partitions are perpendicular to said first and second surfaces.

3. A telephone mouthpiece according to claim 1, wherein said plurality of partitions are parallel to said first and second surfaces.

4. A telephone mouthpiece according to claim 1, wherein at least one of said plurality of slits has a size which is different from a size of another of said plurality of slits.

5. A telephone mouthpiece according to claim 1, wherein said acoustic duct box is unitary with said telephone mouthpiece enclosure, and said acoustic duct box and said partitions are unitary.

6. A telephone mouthpiece, comprising:

a telephone mouthpiece enclosure;

a microphone provided within said telephone mouthpiece enclosure;

a microphone housing arranged within said telephone mouthpiece enclosure, having a flat plate having a through hole at one end, and a housing cover, for housing said microphone, arranged on said flat plate at said one end; and an acoustic duct having an acoustic duct box arranged on said flat plate, said acoustic duct box having a first surface facing said flat plate, said top surface having an acoustic perforation, said acoustic perforation being located so that an axis line from said acoustic perforation to said hole formed in said flat plate is not normal to said flat plate, and a plurality of partitions arranged within said acoustic duct box so that said axis line passes through at least one of said plurality of partitions, and each of said plurality of partitions having a slit.

7. A telephone mouthpiece according to claim 6, wherein said acoustic duct has a receptacle and is unitary with said telephone mouthpiece enclosure, and wherein said microphone housing has a protuberance for engaging with said receptacle for positioning said microphone housing with said acoustic duct and said telephone mouthpiece enclosure.

8. A telephone mouthpiece according to claim 6, wherein said microphone housing comprises a rubber material.

9. A telephone mouthpiece according to claim 6, wherein at least one of said plurality of slits has a size which is different from a size of another of said plurality of slits.

10. A telephone mouthpiece according to claim 6, wherein said partitions are perpendicular to said first surface and perpendicular to said flat surface on which said housing enclosure is arranged.

11. A telephone mouthpiece according to claim 10, wherein said plurality of partitions comprise a first partition and a second partition, and said first and second partitions are arranged in order of distance away from said acoustic perforation, and wherein a distance of said first partition to said second partition is about 10 mm, and wherein said slit of said first partition is a square of which each side is about 1 mm and said slit of said second partition is a square of which each side is about 0.25 mm.

12. A telephone mouthpiece comprising:

a microphone;

a microphone housing having
- a flat plate having a hole at one end, and
- a cylindrical box, for housing said microphone, arranged on said flat plate at said one end where said hole is; and an acoustic duct having
- an acoustic duct box arranged on said flat plate of said microphone housing, said acoustic duct box having a surface facing said flat plate, said surface having an acoustic perforation normal to a location on said flat plate which is laterally displaced from said one end of said flat plate where said hole is located, and a plurality of partitions arranged within said acoustic duct box, each of said plurality of partitions having a respective slit formed therein.

13. A telephone mouthpiece according to claim 12, wherein at least one of said plurality of slits has a size which is different from a size of another of said plurality of slits.

14. A telephone mouthpiece according to claim 12, wherein said microphone housing comprises a rubber material.

15. A telephone mouthpiece according to claim 12, wherein said acoustic duct has a receptacle and is unitary with said telephone mouthpiece enclosure and wherein said microphone housing has a protuberance for engaging with said receptacle for positioning said microphone housing with said acoustic duct and said telephone mouthpiece enclosure.

16. A telephone mouthpiece according to claim 6, wherein said microphone housing comprises a rubber material.

17. A telephone mouthpiece according to claim 12, wherein said plurality of partitions are perpendicular to said first and second surfaces.

18. A telephone mouthpiece according to claim 17, wherein a first of said plurality of partitions is proximal to said acoustic perforation of said acoustic duct box and a second of said plurality, of partitions is proximal to said microphone with a distance between said first partition and said second partition of about 10 mm, and wherein said slit of said first partition is a square of which each side is about 1 mm and said slit of said second partition is a square of which each side is about 0.25 mm.

19. A method for reducing wind noise input to a telephone mouthpiece, comprising steps of:

arranging a microphone on a first surface of an acoustic duct, said microphone having a receiving surface facing a second surface of said acoustic duct, said second surface having an acoustic perforation through which a voice sound can be input to the acoustic duct;

partitioning said acoustic duct with a plurality of partitions, each of said plurality of partitions having a slit; and inputting a voice sound through said acoustic perforation.

20. A method according to claim 19, wherein a slit of at least one of said plurality of partitions has a size different from a size of a slit of another of said plurality of partitions.

* * * * *